(12) United States Patent
Keyes

(10) Patent No.: US 8,033,754 B2
(45) Date of Patent: Oct. 11, 2011

(54) METHOD OF INSTALLING PRE-INSULATED PIPING

(75) Inventor: Thomas Joseph Keyes, Fort Worth, TX (US)

(73) Assignee: Thermacor Process, L.P., Fort Worth, TX (US)

( * ) Notice: Subject to any disclaimer, the term of this patent is extended or adjusted under 35 U.S.C. 154(b) by 248 days.

(21) Appl. No.: 12/543,825

(22) Filed: Aug. 19, 2009

(65) Prior Publication Data

US 2011/0041925 A1 Feb. 24, 2011

(51) Int. Cl.
*F16L 1/028* (2006.01)
(52) U.S. Cl. .................. 405/184.4; 405/184; 405/154.1
(58) Field of Classification Search ............... 405/154.1, 405/174, 184, 184.4
See application file for complete search history.

(56) References Cited

U.S. PATENT DOCUMENTS

| | | | | |
|---|---|---|---|---|
| 2,823,701 A * | 2/1958 | Burk | | 138/103 |
| 6,585,047 B2 * | 7/2003 | McClung, III | | 166/302 |
| 6,978,807 B1 | 12/2005 | Keyes | | |
| 7,028,717 B1 | 4/2006 | Keyes | | |
| 7,143,788 B2 | 12/2006 | Keyes | | |
| 7,418,979 B2 | 9/2008 | Keyes | | |
| 2007/0029008 A1 * | 2/2007 | Liu | | 141/387 |
| 2008/0173367 A1 * | 7/2008 | Keyes | | 405/184.5 |

* cited by examiner

*Primary Examiner* — Frederick L Lagman
(74) *Attorney, Agent, or Firm* — Charles D. Gunter, Jr.

(57) ABSTRACT

An installation technique is shown for use with a pre-insulated steam piping system having an inner steel carrier pipe surrounded by a layer of foam insulation and then by an outer protective jacket. An expansion loop is used to create an artificial low point in the overall pipeline which allows the pipeline to avoid a buried obstruction without the necessity of increasing the depth of the remaining portion of the pipeline on either side of the loop. The expansion loop has a pair of oppositely arranged side legs which are joined by a cross-leg portion of the loop, the cross-leg portion of the loop being angled downwardly at a predetermined angle, to thereby provide a change in elevation which avoids the buried obstruction in the pathway of the pipeline.

9 Claims, 5 Drawing Sheets

METHOD OF INSTALLING PRE-INSULATED PIPING

BACKGROUND OF THE INVENTION

1. Field of the Invention

The present invention relates to pre-insulated piping systems, and more specifically to a method for installing such systems which avoids preexisting obstacles in the pathway of the pipeline while eliminating the need for valve pits or more complicated placement techniques.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school or college campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Pre-insulated pipe is conventional and commercially available. There are predominately two types of such piping systems in use: Class-A drainable dryable testable (DDT); and polyurethane or polyisocyanurate "bonded" foam systems. Both of these systems use an inner carrier pipe to convey fluid. Although steel is commonly used for the inner pipe which carries the media to be piped, copper or aluminum or other metals as well as fiberglass, PVC, and similar materials may be utilized, as well. Around the outside of the steel pipe is a layer of insulating foam such as, for example, polyisocyanurate foam. Around the outside of the foam is a jacket of hard thermoplastic (such as high density polyethylene, HDPE). The foam has set up or cured within the outer jacket so as to bond to the jacket and to the inner pipe. The plastic jacket protects the foam from mechanical damage and also provides a water tight seal to prevent corrosion of the steel pipe. In the bonded type system, the foam and outer jacket do not move relative to the inner pipe. In the Class-A type system, on the other hand, the insulated inner pipe is designed to move independently of the associated outer jacket. In fact, there is an air gap between the inner pipe and outer carrier pipe in the class-A type system.

The bonded foam piping systems are normally installed in a subterranean location by digging a trench from the surface and by then laying down the pipe. Thus, in pre-insulated piping systems of the type under consideration, one of the principal expenses in the overall cost of the job is the cost of trenching. As the depth of the trench increases, the water table depth is approached in some locations. This can lead to additional problems with de-watering the trench, and the like. The deeper the trench being dug, the greater the need for shoring up the excavation to meet applicable safety standards for workers. Obviously, the nearer the pipeline can be laid to the surface the better, at least as far as lessening the excavation costs and avoiding some of the previously mentioned problems.

However, in any given pipeline installation project, the path of the pipeline tends to be obstructed, at points, by various types of of above ground or underground structures. For example, the path of the pipeline may encounter a buried "duct bank" containing electrical wires or cables, fiber optic cables, and the like. The wires/cables are typically buried in concrete, with the resulting duct bank being a foot or more in cross sectional area.

In the past, it was generally necessary to either take the pipeline deeper to go below the duct bank, or to build in place a "valve pit" or manhole to allow a change in elevation of the pipeline. This added greatly to the cost of the installation. In addition, with steam lines, it was necessary to provide the appropriate "slope" to the pipe line, along with the change in elevation, and to provide appropriate condensate collection and drain points to prevent the buildup of condensate in the overall pipeline.

Despite the advances which have been made in pre-insulated piping systems in recent years, and in the installation techniques which are used to place the pipelines in the desired subterranean locations, a need continues to exist for further improvements.

For example, a need exists to provide an installation technique which allows a pre-insulated pipeline to be routed so as to avoid existing obstacles in the path of the pipeline, without greatly increasing the depth of the overall pipeline.

A need also exists for such an installation technique which eliminates the need for adding valve pits or manholes in order to accommodate changes in elevation in the pipeline.

A need also exists for such an installation method which utilizes many of the conventionally available materials and installation techniques commonly used in the industry and which is relatively simple in design and economical to implement.

SUMMARY OF THE INVENTION

The present invention has as its object to provide an improved method of installing a pre-insulated piping system of the type used for conveying high temperature fluids where a preexisting obstruction is located in a proposed pathway of the pipeline. A length of insulated and jacketed pre-insulated piping is provided which is buried to a given depth in a subterranean location. The length of piping is made up of an inner carrier pipe having an interior surface and an exterior surface. An envelope of foamed insulation surrounds the inner pipe exterior surface. An outer protective jacket surrounds the envelope of insulation. The length of piping has a joining end for joining to an adjacent length of piping, whereby the adjacent lengths of piping provide a continuous length of buried conduit for conveying high temperature fluids, such as steam.

In the method of the invention, an artificial low point is created at a selected subterranean location in the pathway of the pipeline in order to avoid, for example, a buried obstruction located in the pathway of the pipeline, thereby avoiding the necessity of increasing the depth of the remaining length of pre-insulated piping in the overall pipeline. The artificial low point is preferably comprised of an expansion loop in the pipeline. The expansion loop is made up of a pair of oppositely arranged side legs which are joined by an intermediate, cross-leg portion of the loop. The cross-leg portion of the loop is angled downwardly at a predetermined angle with respect to the elevation of the remainder of the length of piping, to thereby provide a change in elevation which can be used to avoid the obstruction in the pathway of the pipeline. The lengths of insulated piping can be part of a pipeline conveying steam, hot water or other hot fluids at a temperature above about 212° F. The buried obstruction can be, for example, a buried electrical duct bank containing electrical wires or cables.

In one preferred form of the invention, that portion of the length of insulated piping which forms the expansion loop is provided with a condensate drain line which communicates with the cross-leg portion of the loop and which extends therefrom to a discharge location for removing trapped condensate from the piping installation.

The cross-leg portion of the expansion loop forms a relatively stable point in the overall loop. As a result, this loop location can be used as an attachment point to connect additional auxiliary lines, or components, since the cross-leg portion of the expansion loop undergoes almost no side to side movement due to expansion or contraction forces in the pipeline.

Additional objects, features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
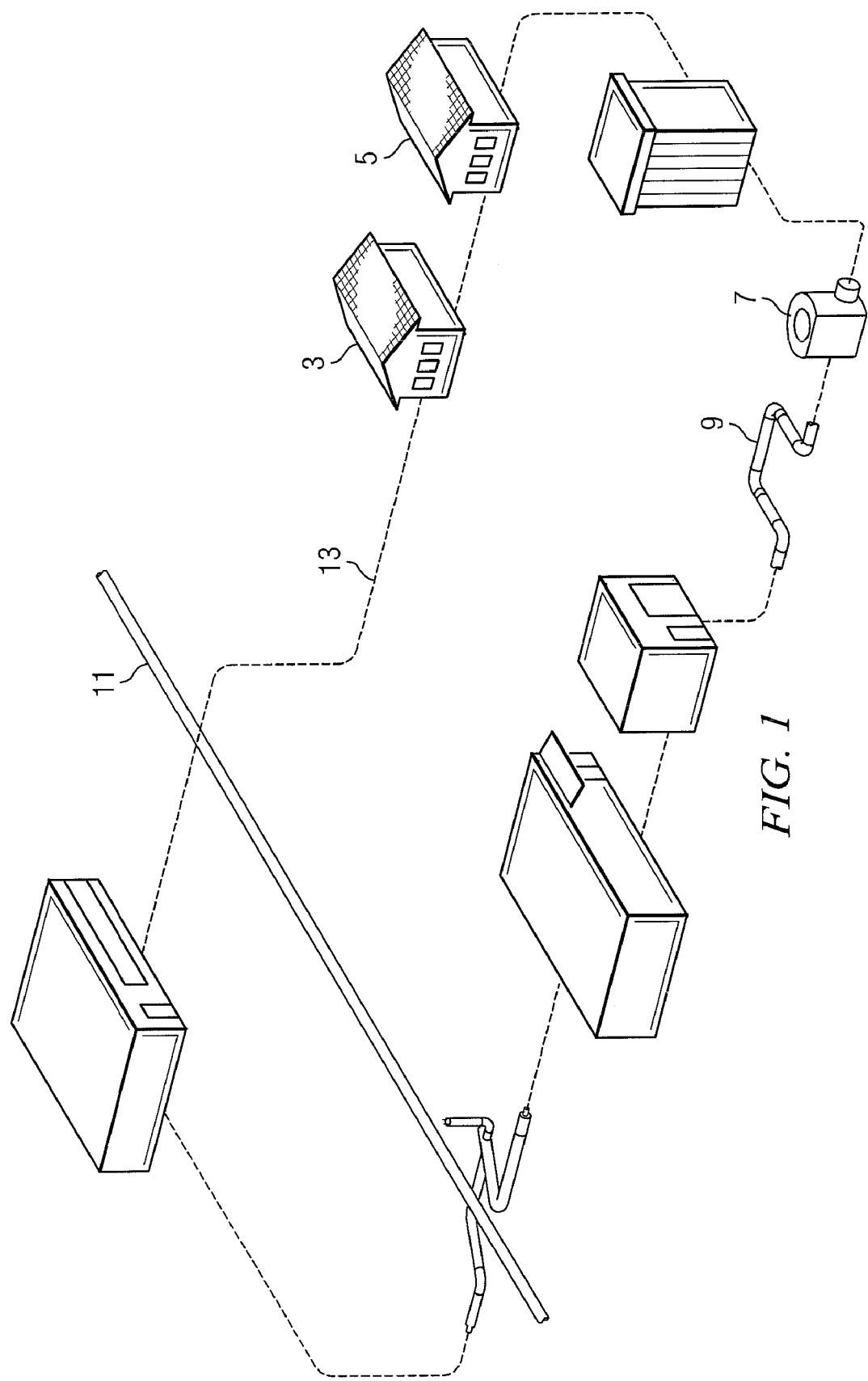
FIG. 1 is a simplified representation of a typical distributed HVAC system of the type under consideration which is transporting a high temperature fluid, such as steam, for heating and showing the installation technique of the invention being used to avoid an underground electrical duct bank.

Turning first to FIG. 1 of the drawings, there is illustrated a typical environment in which the pre-insulated piping systems of the invention might be employed. FIG. 1 shows a school campus having a number of isolated buildings 3, 5 connected by an underground insulated pipeline carrying steam which at points includes right angle loops or elbows 9. The loops 9 are provided in a typical piping system of the type illustrated in order to compensate for expansion and contraction forces which are exerted on the piping. The piping system will also typically include one or more manholes or "valve pits" 7. The valve pits 7 are conventional in the industry, are typically formed of cast concrete, and may include portholes and riser sections.

As will be apparent from the discussion which follows, the installation method of the invention could be used with a variety of types of pipes and piping systems. For sake of illustration, the principles of the invention will be described in relation to the school campus shown in FIG. 1 and, more particularly with respect to the electrical duct bank (11 in FIG. 1) which forms an underground obstruction for the pipeline being laid.

The adjoined sections of pipe (illustrated in simplified form by the dotted lines 13 in FIG. 1) are foam bonded pre-insulated piping sections, as that term is used in the relevant art. Each length of pipe includes an inner pipe, typically formed of steel, an envelope of foamed insulation surrounding the inner pipe, and outer protective jacket surrounding the envelope of insulation. The joining ends of the adjacent steel inner carrier pipe are affixed, as by being welded together, to form fixed joints, whereby the adjacent pipe lengths provide a continuous fluid conduit for conveying high temperature fluids. The inner foamed insulation will typically be of polyurethane or high temperature polyisocyanurate, while the outer protective jacket is typically formed of high density polyethylene (HDPE) or a similar polyolefin type material. The following references, among others, teach the manufacture of prior art insulated piping systems of the general type under consideration: U.S. Pat. Nos. 3,793,411; 4,084,842; and 4,221,405, all to Stonitsch et al.

The piping systems of the type illustrated in the drawings are typically utilized to convey fluids at high temperature and/or pressures. For example, a typical steam line might be conveying fluid at, for example, 400° F. The temperature differentials which exists between the piping system materials and the fluid being conveyed cause expansion and contraction forces to be applied along the coaxially aligned pipe lengths.

The expansion and contraction forces are partially compensated for in the prior art by including one or more expansion loops (such as the loop illustrated at 9 in FIG. 1). It is also typically necessary to include one or more anchor installations (such as the anchor installations 15, 17 in FIG. 2A) at various points along the length of piping. For example, it is typically necessary to install an anchor assembly just prior to the porthole openings (such as the porthole opening 19 in FIG. 2A) of the concrete manhole, since the sealed portholes do not generally allow for longitudinal movement of the piping. This is primarily due to the fact that the piping is sealed at the point of entry into the manhole or valve pit.

With reference again to FIG. 1, it will be appreciated that various types of obstructions in the environment can disrupt the pathway of the pipeline being laid. In the example shown in FIG. 1, the duct bank 11 can contain, for example, electrical wires, fiber optic cables, etc. Another common obstruction is an underground water line or sewer line. In the case of the duct bank 11, the longitudinally extending electrical wires are commonly encased in a block of concrete which may be a foot or more in cross sectional area.

The presence of the obstruction, in this case the duct bank 11, generally requires that the overall pipeline depth be increased or that some other construction technique be utilized to avoid the obstruction.

Figure 2A:
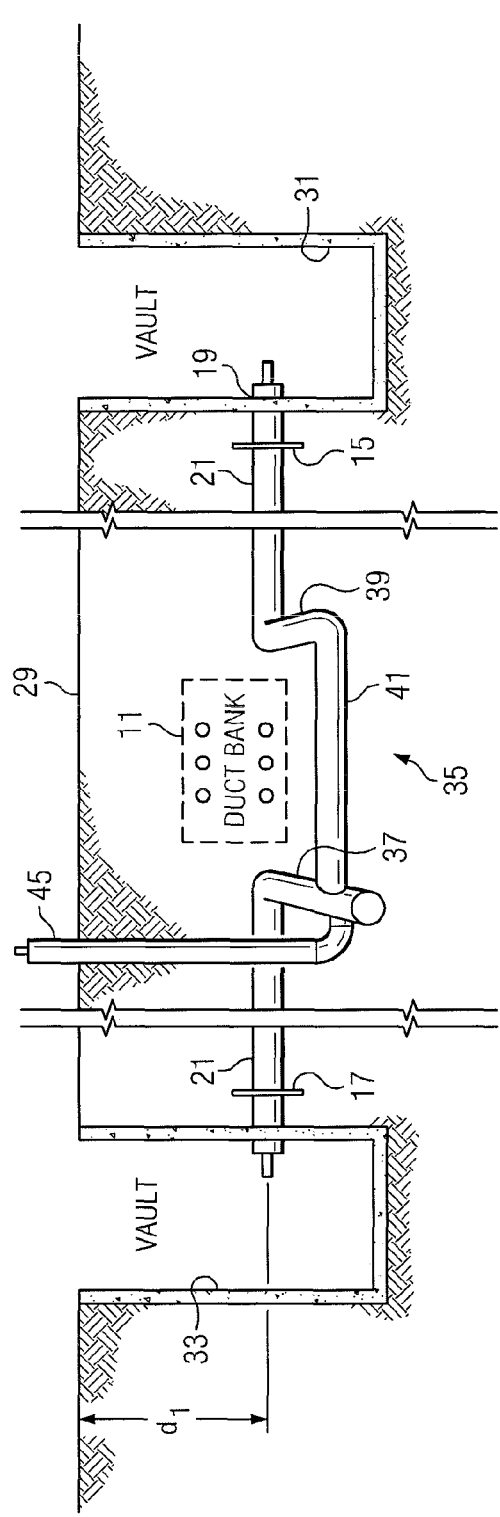
FIG. 2A is a simplified view, partly in section, showing the pipeline components used in the method of the invention in which an expansion loop is used to create an artificial low point in the pipeline which avoids the buried obstruction.
Figures 5, 6:
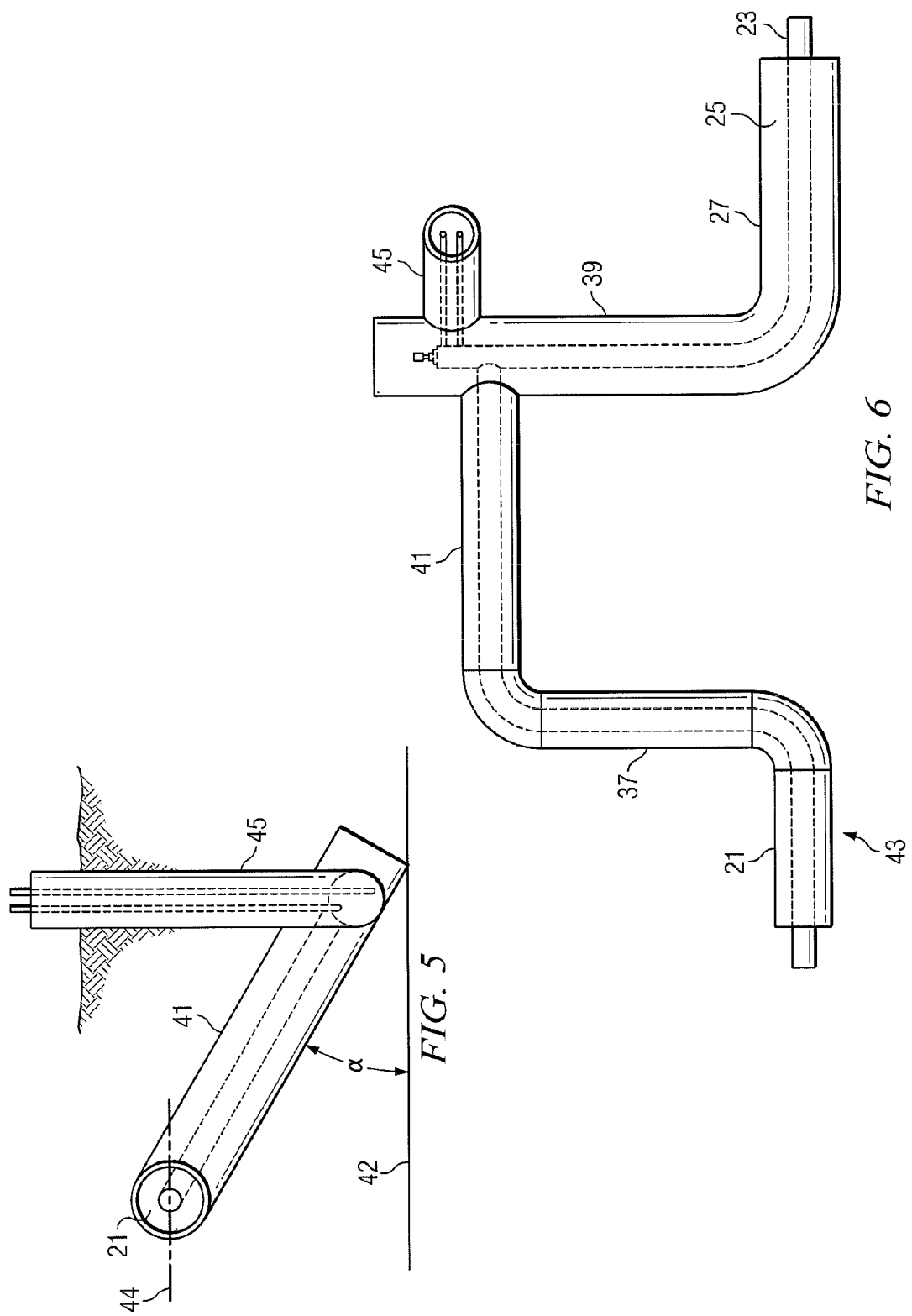
FIG. 5 is an end view of the expansion loop of FIG. 4.
FIG. 6 is a top, plan view of the expansion loop of FIG. 4.

FIG. 2A shows a section of pre-insulated piping 21 which is modified to avoid the obstruction posed by the duct bank 11. As has been briefly mentioned, the pipeline 21 a length of insulated and jacketed pre-insulated piping of the type having an inner carrier pipe (23 in FIG. 6) typically formed of a suitable metal, such as steel, and having an interior surface and an exterior surface. An envelope of foamed insulation 25 surrounds the inner pipe exterior surface and may comprise, for example the previously described high temperature polyisocyanurate. An outer protective jacket 27 surrounds the envelope of insulation. The outer protective jacket may be an HPDE material. The length of piping has a joining end (29 in FIG. 3A) for joining to an adjacent length of piping, whereby the adjacent lengths of piping provide a continuous length of fluid conduit for conveying high temperature fluids.

Prior art pipe lengths of this general type are commercially available as standard factory type product. For example, such product is available from Thermacor Process, LP of Fort Worth, Tex, assignee of the present invention. One typical example is sold commercially as the "HT-406 High Temp Steel Piping System™."

As will be appreciated, in the discussion which follows, the improved installation techniques of the invention can be used advantageously with the "HT-406 High Temp Steel Piping System™". However, the installation techniques of the invention might also be used with other commercial piping systems used in the insulated pipe industries, as well. For example, the system of the invention could be used with Applicant's "Duo-Therm 505"™ system, of similar systems. In other words, the unique aspects of Applicant's systems may be used in a variety of applications requiring bonded foam pre-insulated piping where high temperature fluids such as steam are being transported and expansion and contraction forces are being experienced in the pipeline.

The reference in this discussion to pipe "lengths" is intended to refer to standard available factory pre-insulated piping of the type previously described having an inner metal pipe surrounded by an envelope of foamed insulation, which in turn, is contained within a polyolefin jacket.

As has been mentioned, the lengths of insulated piping under discussion will typically be part of a pipeline conveying steam, hot water or other hot fluids at a temperature above about 212° F. The term "high temperature", as used in this discussion, will therefore mean any temperature exceeding about 212° F. Also, where the temperature exceeds about 250° F. the layer of foam insulation which surrounds the inner steel carrier pipe will typically be formed of a high temperature foam material, such as a suitable polyisocyanurate, rather than a polyurethane foam, since 250° F. is the present temperature limitation at which polyurethane foam is used in bonded foam systems.

In the method of the invention illustrated in FIG. 2A, the straight run of pipe 21 is modified to accommodate the obstacle 11. This is accomplished by creating an intentional low point in the pipeline which avoids the obstruction caused by the presence of the duct bank 11 in the pathway of the pipeline. The pipeline 21 is shown buried to a given depth in a subterranean location. The pipeline is preferably kept relatively close to the surface 29, since trenching costs increase with increasing depth requirements. In the example shown in FIG. 2A, the depth "$d_1$" is approximately three feet. The creation of the artificial low point avoids the necessity of increasing the depth of the remaining length of pre-insulated piping in the overall pipeline. Also, while the length of piping 21 in FIG. 2A is shown for simplicity of illustration as being located between two valve pits 31, 33, it will be appreciated that, in practice, the piping might run for hundreds of feet between valve pits or anchor locations.

Figure 4:
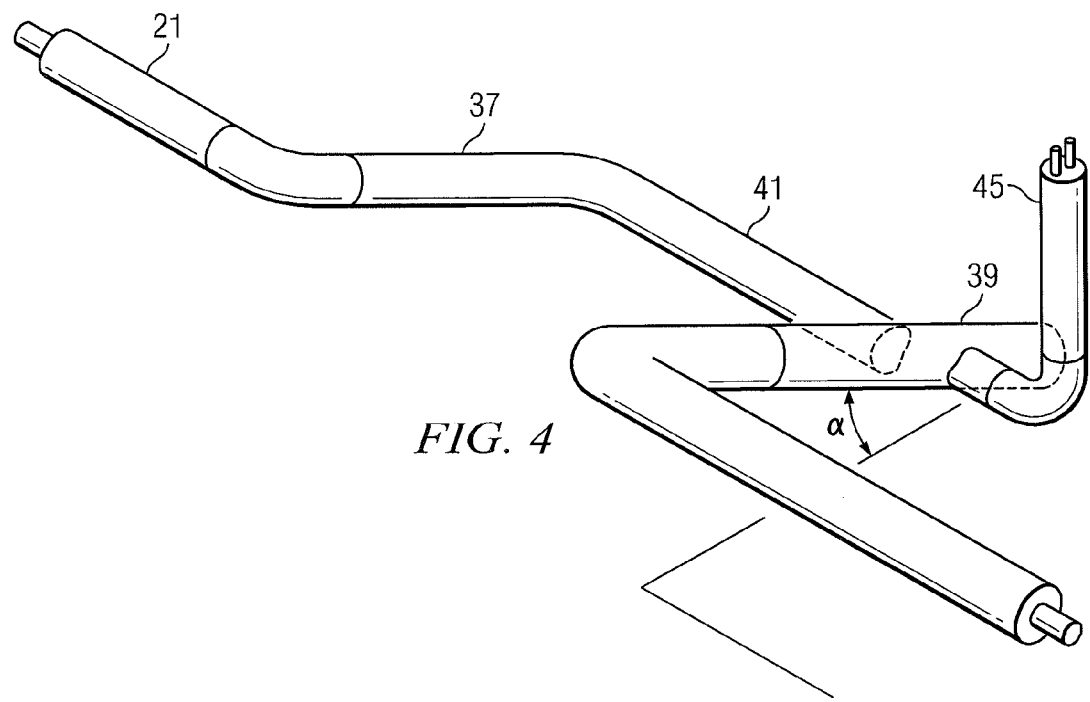
FIG. 4 is an isolated view of the expansion loop portion of the pipeline used in the installation technique of the invention.

With reference again to FIG. 2A, the artificial low point which is created in the pipeline is comprised of an expansion loop (generally at 35) in the pipeline. The expansion loop has a pair of oppositely arranged side legs 37, 39, which are joined by a cross-leg portion 41 of the loop. As can perhaps best be seen in the isolated views presented in FIGS. 4 and 5, the cross-leg portion of the loop is angled downwardly at a given predetermined angle with respect to the elevation of the remainder of the length of piping 21, to thereby provide a change in elevation which avoids the buried obstruction in the pathway of the pipeline. As illustrated in simplified fashion in FIG. 5, the angle "∝" which the cross-leg portion of the expansion loop forms with respect to the elevation of the remainder of the length of piping and with respect to a horizontal plane of reference (42 in FIG. 5), is typically in the range from about 5 to 40°. In the particular example shown in FIG. 5, the angle "∝" is approximately 30°. In other words, the remaining straight run of pipe 21 lies in a plane which is approximately parallel to the horizontal plane 42.

Until recently, it would not generally have been thought to be practical to install an intentional low point in a steam conveyance system of the type under consideration, because of the necessity of then providing a condensate drain of some type. However, recent mathematical modeling of pre-insulated piping systems of the type under consideration have revealed that the cross-leg portion 41 of the expansion loop forms a relatively stable point in the overall loop, even where the remainder of the pipeline is subjected to various degrees of thermal stress. For example, in some test installations, the juncture region (illustrated at 43 in FIG. 6) of the expansion loop underwent as much as 3 inches of side to side movement during expansion and contraction of the pipeline. However, the cross-leg portion 41 of the loop exhibited almost no side to side movement. This fact allows the cross-leg portion of the loop to be used as an attachment point to connect additional auxiliary lines, such as a steam condensate line, which communicates with the interior of the pipeline.

For example, in the steam pipeline systems illustrated in the drawings, the cross-leg portion 41 of the expansion loop 35 is fitted with a condensate drain line 45 which communicates with the cross-leg portion of the loop and which extends therefrom to a surface location for removing trapped condensate from the piping installation.

Figure 2B:
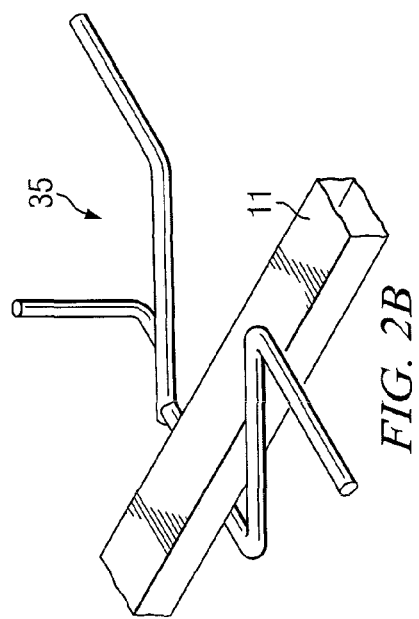
FIG. 2B is a simplified, schematic view of the relationship between the depth and location of the expansion loop and the location of the buried duct bank in FIG. 2A.

As will be appreciated from FIG. 2A, the installation method of the invention, using the downwardly angled expansion loop 35, allows the remainder of the overall pipeline (shown generally at 21 in FIG. 2A of the drawings) to be kept at a relatively shallow subterranean location, i.e., on the order of three feet. This results in a large cost savings over the alternative method of increasing the overall depth of the installation trench, or of installing additional concrete manholes or valve pits. FIG. 2B is a schematic illustration of the use of the loop 35 to angle under the existing duct bank obstruction at the job site by creating an artificial low point with respect to the adjoining straight run of pipe.

Figure 3A:
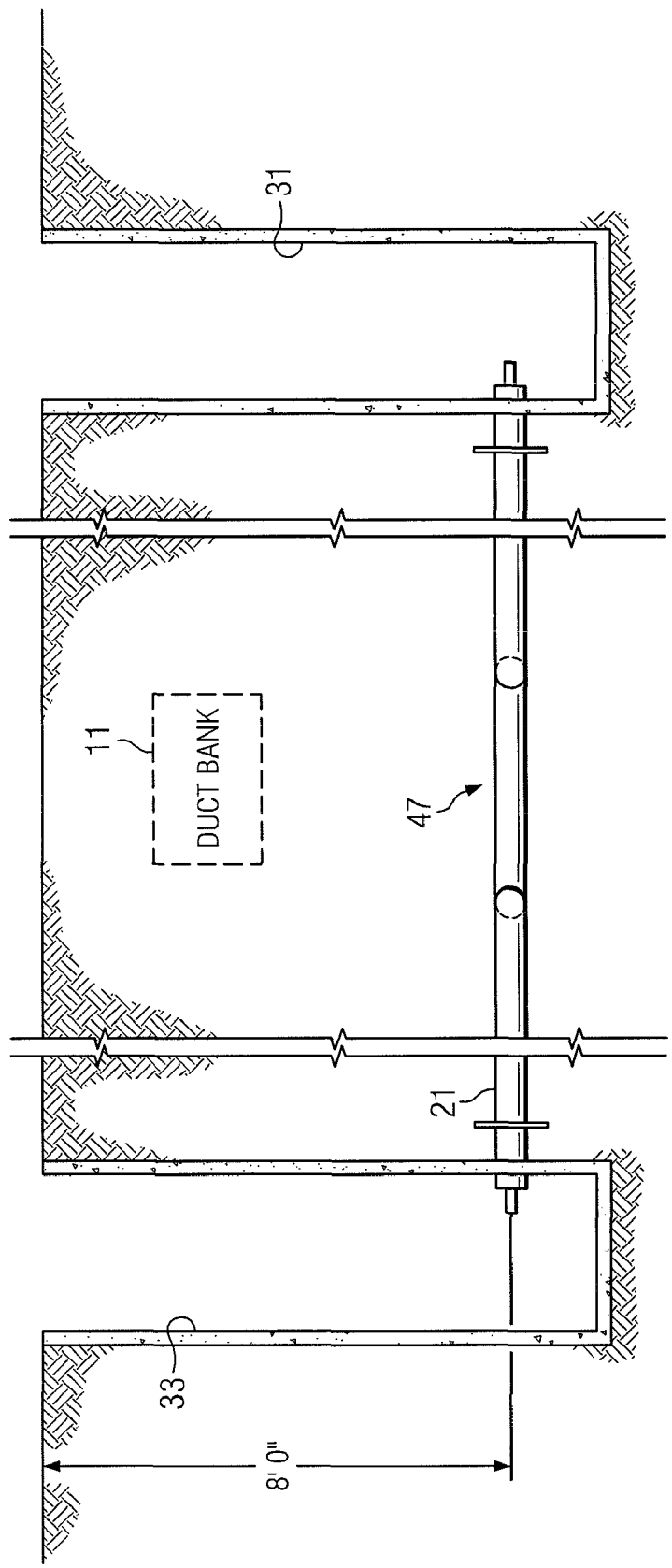
FIG. 3A is a view similar to FIG. 2A, but showing the pipeline being taken to a lower depth in order to avoid the location of the buried electrical duct bank.
Figure 3B:
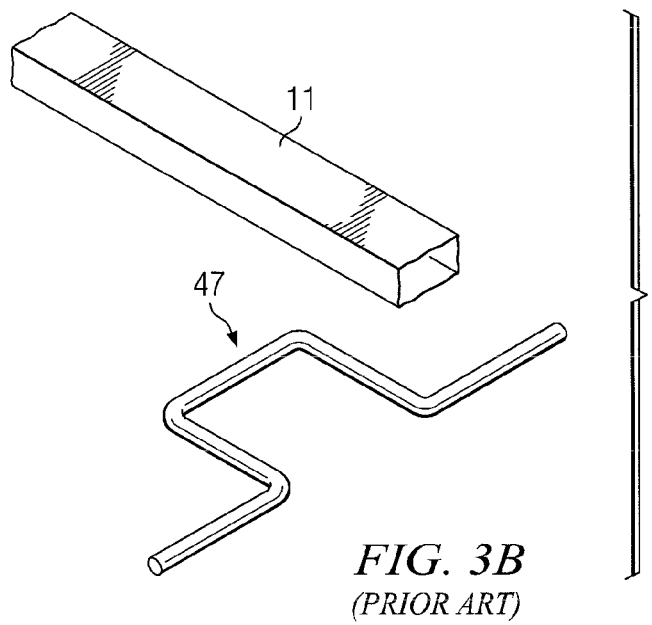
FIG. 3B is a simplified, schematic view, similar to FIG. 2B, showing the relationship between the depth and location of the pipeline and the buried duct bank in the prior art system.

FIG. 3A is a simplified view, similar to FIG. 2A, but showing the prior art technique of digging a deeper trench to install the pipeline 21, thereby avoiding the duct bank 11. While this alternative construction technique can certainly be used to overcome the problem at hand, it can greatly increase the cost of the overall installation. In the example shown in FIG. 3A, the pipeline 21 is located at a depth "$d_2$" of approximately 8 feet. FIG. 3B is a simplified schematic, similar to FIG. 2B, showing a comparison of the location of the loop 47 to the existing duct bank. Note that the loop 47 in FIG. 3A lies on its side, but is not otherwise angled downwardly at an angle with respect to the plane of the remainder of the pipeline. Rather, it lies in a plane approximately parallel to the plane of the duct bank 11.

An invention has been provided with several advantages. The installation method of the invention can be used with pre-insulated piping systems of the type which are commercially available in the industry. The system of the invention thus utilizes many of the conventionally available materials and installation techniques commonly used in the industry, and which is relatively simple in design and economical to implement. By avoiding the necessity of deeper trenching or the incorporation of additional structural components such as valve pits, unnecessary costs are eliminated, lowering the overall cost of the installation. The fact that the cross-leg portion of the loop is relatively stable allows additional auxiliary lines, components or fittings to be connected at this point in the loop. In the case of a steam system, the auxiliary line can be a steam condensate line to remove condensate build-up in the system.

While the invention has been shown in one of its forms, it is not thus limited but is susceptible to various changes and modifications without departing from the spirit thereof.

What is claimed is:

1. A method of installing a pre-insulated piping system of the type used for conveying high temperature fluids where a buried obstruction is located in a proposed pathway of the pipeline, the method comprising the steps of:
    providing a length of insulated and jacketed pre-insulated piping which is buried to a given depth in a subterranean location, the length of piping comprising an inner carrier pipe having an interior surface and an exterior surface, an envelope of foamed insulation surrounding the inner pipe exterior surface, and an outer protective jacket surrounding the envelope of insulation, the length of piping having a joining end for joining to an adjacent length of piping, whereby the adjacent lengths of piping provide a continuous length of buried conduit for conveying high temperature fluids;
    creating an artificial low point at a selected subterranean location in the pathway of the pipeline in order to avoid a buried obstruction located in the pathway, thereby avoiding the necessity of increasing the depth of the remaining length of pre-insulated piping in the overall pipeline; and
    wherein the artificial low point is comprised of an expansion loop in the pipeline located between adjacent straight lengths of piping, the loop having a pair of oppositely arranged side legs which are joined by a cross-leg portion of the loop, the cross-leg portion of the loop being angled downwardly at a predetermined angle with respect to the elevation of the remainder of the adjacent straight lengths of piping, to thereby provide a change in elevation which avoids the buried obstruction in the pathway of the pipeline.

2. The method of claim 1, wherein the lengths of insulated piping are part of a pipeline conveying steam, hot water or other hot fluids at a temperature above about 212° F.

3. The method of claim 2, wherein the length of insulated piping which forms the expansion loop has a condensate drain line which communicates with the cross-leg portion of the loop and which extends therefrom to a drainage location for removing trapped condensate from the piping installation.

4. The method of claim 1, wherein the buried obstruction is a buried electrical duct bank containing electrical wires or cables.

5. The method of claim 1, wherein the buried obstruction is a buried water or sewer line.

6. The method of claim 1, wherein the angle which the cross-leg portion of the expansion loop forms with respect to a horizontal plane of reference, is in the range from about 5 to 40°.

7. The method of claim 1, wherein the cross-leg portion of the expansion loop forms a relatively stable point in the overall loop which is used as an attachment point to connect additional lines, components or fittings.

8. The method of claim 7, wherein the cross-leg portion of the expansion loop undergoes almost no side to side movement due to expansion or contraction forces in the pipeline.

9. A method of installing a pre-insulated piping system of the type used for conveying steam where a buried obstruction is located in a proposed pathway of the pipeline, the method comprising the steps of:
    providing a length of insulated and jacketed pre-insulated piping which is buried to a given depth in a subterranean location, the length of piping comprising an inner carrier pipe having an interior surface and an exterior surface, an envelope of polyisocyanurate foamed insulation surrounding the inner pipe exterior surface, and an outer polyolefin protective jacket surrounding the envelope of insulation, the length of piping having a joining end for joining to an adjacent length of piping, whereby the adjacent lengths of piping provide a continuous length of buried conduit for conveying high temperature fluids;
    installing a downwardly angled expansion loop which creates an artificial low point at a selected subterranean location in the pathway of the pipeline in order to avoid a buried obstruction located in the pathway, thereby avoiding the necessity of increasing the depth of the remaining length of pre-insulated piping in the overall pipeline;
    wherein the expansion loop in the pipeline is located between adjacent straight lengths of piping, the loop having a pair of oppositely arranged side legs which are joined by a cross-leg portion of the loop, the cross-leg portion of the loop being angled downwardly at a predetermined angle with respect to the elevation of the remainder of the adjacent straight lengths of piping, to thereby provide a change in elevation which avoids the buried obstruction in the pathway of the pipeline; and
    wherein the length of insulated piping which forms the expansion loop has a condensate drain line installed therein at a location which communicates with the cross-leg portion of the loop and which extends therefrom to a drainage location for removing trapped condensate from the piping installation.

* * * * *